Jan. 24, 1967 J. L. DE BOO 3,299,727

SPLIT PULLEY CLUTCH

Filed Dec. 28, 1964

INVENTOR
JEROME L. DEBOO

BY R. C. Terry
ATTORNEY 3,299,727

SPLIT PULLEY CLUTCH

Jerome L. De Boo, Barrington, Ill., assignor to Teletype Corporation, Skokie, Ill., a corporation of Delaware Filed Dec. 28, 1964, Ser. No. 421,274
7 Claims. (Cl. 74—192)

This invention relates to a split pulley clutch and more particularly to a clutch for a tape take-up reel.

In the printing telegraph industry it has long been the practice to record messages in the form of permutation code combinations of holes in paper tapes. After these tapes are recorded upon they are stored for later use by tape utilization devices, after which they frequently become permanent records. Recent developments in the telegraph industry and in the computer industry have resulted in tape preparation and utilization devices which operate at very high speeds and which prepare and utilize tapes of considerable length. Consequently, it has become necessary to provide tape take-up mechanisms for automatically winding the tapes onto tape take-up reels after the tapes leave the tape preparation or utilization devices. Since it is desirable that tape-take-up mechanisms be constantly available for use and be able to wind the tape tightly on the tape take-up reels without applying excess tension to the tapes as they leave the tape preparation or utilization devices, it is necessary to provide these tape take-up mechanisms with clutches for coupling the tape take-up reels to their power sources when it becomes necessary to wind tape onto the tape take-up reels. In order that the tape take-up mechanisms may be inexpensive and maintenance free, characteristics desirable in any mechanism, it is necessary that the clutches employed in the tape take-up mechanisms be comprised of simple and easily manufactured parts.

Accordingly, an object of this invention is to provide an inexpensive and easily manufactured clutch.

Another object of this invention is to provide a novel clutch for use in tape take-up mechanisms.

Another object of this invention is to provide an inexpensive and maintenance free tape take-up mechanism.

In the preferred embodiment of this invention a driving pulley half is fixed to a drive shaft so that it can move neither axially or rotatably with respect to the shaft. A driven pulley half is fixed for rotation with a sleeve which is mounted on the drive shaft so that it is free to rotate with respect to the shaft but is secured from axial movement with respect thereto. The pulley halves are mounted closely adjacent to each other and are provided with cooperating beveled edges which form a V-shaped slot between them. A tape sensing arm is provided and an idler pulley is mounted on the arm so that it is raised when a tape which passes over the tape sensing arm is in a slack condition and is lowered when the tape is in a taut condition. A V-belt is passed around the idler pulley and through the V-shaped slot between the driving plate and the driven plate. When the idler pulley is raised the V-belt is wedged into frictional engagement between the driving plate and the driven plate to provide a connection between the driven plate and the driving plate and the driving plate to rotate the sleeve with the drive shaft. When the idler pulley is lowered, the V-belt moves out of frictional engagement with the driving pulley and the driven pulley thereby breaking the driving connection between the driven plate and the driving plate. A tape take-up reel is attached to the sleeve so that when the tape which passes over the tape sensing arm is loose and the idler pulley is raised the tape take-up reel will be rotated and tape will be wound upon the reel and so that when the tape is taut the idler pulley will be lowered and the tape take-up reel, which is mounted on the sleeve, will be disconnected from the drive shaft.

The present invention may be more fully understood by having reference to the following detailed description when taken in conjunction with the drawing wherein.

Figures 1, 2, 3:
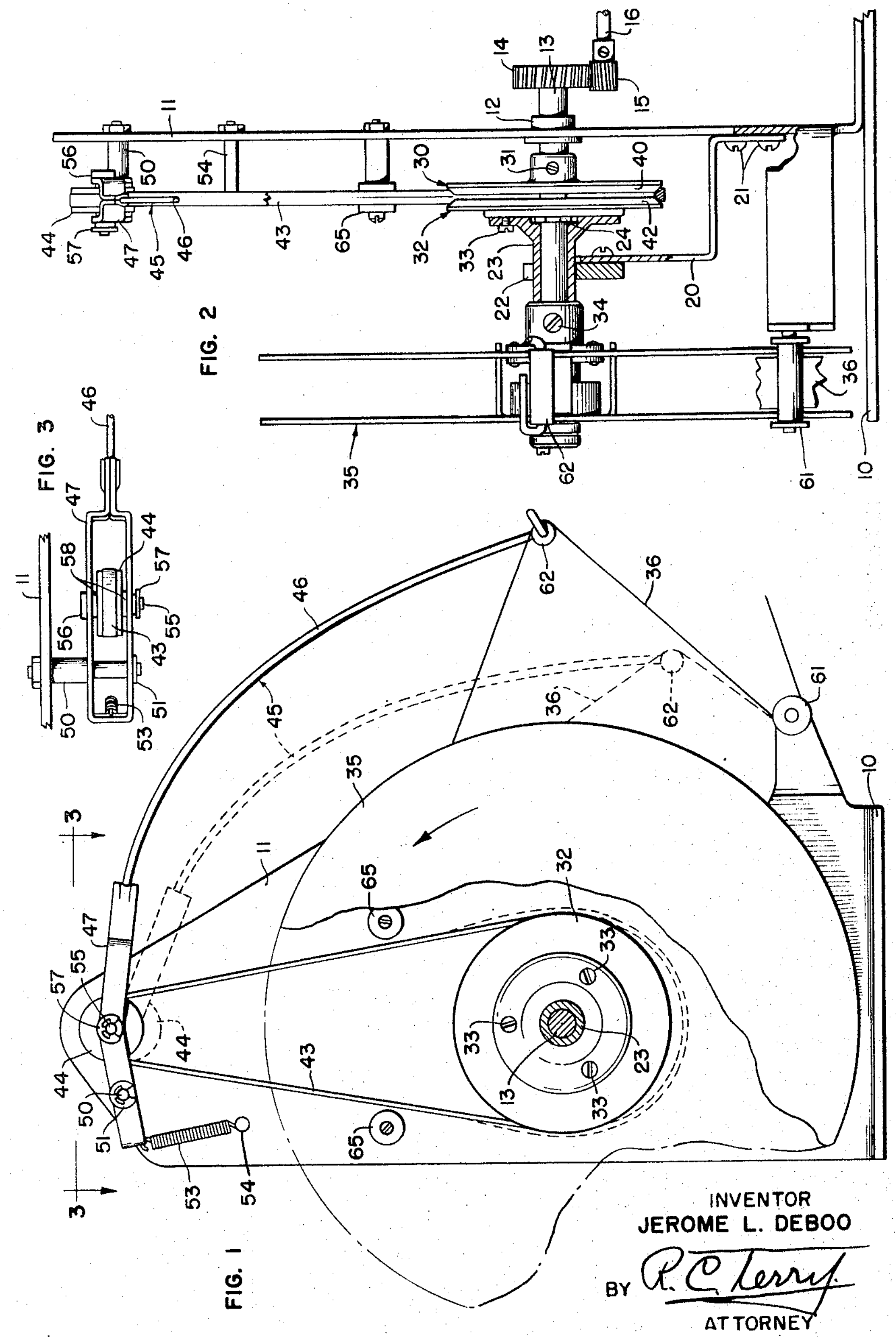
FIG. 1 is a front view of a device embodying the present invention in which parts have been broken away to more clearly illustrate certain features of the invention.
FIG. 2 is a right side view in which parts have been broken away to more clearly illustrate certain features of the invention.
FIG. 3 is a partial top view taken looking from the line 3—3 in FIG. 1 in the direction of the arrows.

Referring now to the drawings, wherein like reference numerals designate like parts in the several views, with particular reference being had to FIG. 2, there will be seen a base plate 10 upon which is mounted a supporting plate 11 that serves to support the various parts and subassemblies of the device. Mounted in the support plate 11 is a bushing 12 which supports a drive shaft 13 for rotation with respect to the supporting plate 11. A gear 14 is attached to the drive shaft 13 and serves to supply power to the device. Gear 14 is in mesh with and is driven by a pinion 15 which is secured to a power input shaft 16. The power input shaft 16 is driven by any suitable motor or other power source (not shown).

An L-shaped bracket 20 is secured to the supporting plate 11 by means of fasteners 21. Mounted on the L-shaped bracket 20 is a bearing 22 which supports a driven sleeve 23 for rotation with respect to the L-shaped bracket 20. The driven sleeve 23 surrounds the drive shaft 13 and is free for rotation with respect to the shaft 13. A snap ring 24 serves to prevent axial movement of the sleeve 23 with respect to the drive shaft 13.

A driving pulley half 30 is secured to the drive shaft 13 by a set screw 31 and is thereby restrained from movement, either axially or rotatably, with respect to the drive shaft 13. A driven pulley half 32 is attached to the sleeve 23 by means of fasteners 33. The driven pulley half 32 is free to rotate with respect to both the drive shaft 13 and the driving pulley half 30, but is secured from axial movement with respect to the drive shaft 13 and the driving pulley half 30 by the snap ring 24. A tape take-up reel 35 is mounted on the sleeve 23 by means of a set screw 34 and is used to wind up a tape 36. This tape take-up reel may be of any of the currently available types but preferably is of the type shown and described in United States Patent No. 3,025,016, granted to J. L. De Boo on March 13, 1962. Due to its mounting on the sleeve 23 the take-up reel 35 is rotated whenever the sleeve 23 is rotated and is free for rotation with respect to the drive shaft 13 whenever the driven sleeve 23 is free for such rotation.

The driving pulley half 30 and the driven pulley half 32 have annular beveled edges 40 and 42, respectively. The beveled edge 40 on the drive half 30 is sloped downwardly toward the driven pulley half 32 and the beveled edge 42 is sloped downwardly toward the drive pulley half 30. The beveled edges 40 and 42 cooperate to form an annular V-shaped groove or slot between the driving pulley half 30 and the driven pulley half 32. Mounted in this V-shaped slot is a V-belt 43, the V-shape of which is of the same configuration as the V-shaped groove between the pulley halves. The V-belt 43 extends over and around an idler pulley 44 which is mounted on a tape sensing arm 45.

The tape sensing arm 45 is comprised of a round wire, tape sensing portion 46 and a box-shaped supporting portion 47. As may be seen in FIG. 3 the supporting portion 47 of the tape sensing arm 45 is formed from sheet metal which is bent into a rectangularly shaped box that is joined together at its righthand end (FIG. 3). The round tape sensing portion 46 of the tape sensing arm 45 is secured between the sides of the supporting portion 47 and may be fixed therein by any appropriate means such as brazing. The tape sensing arm 45 is pivotally mounted on the reduced forward portion of a pivot stud 50 and is secured thereon by a snap ring 51. The tape sensing arm is biased to rock counter-clockwise (FIG. 1) by a spring 53 which is secured between a post 54, mounted on the supporting plate 11, and one wall of the supporting portion 47 of the tape sensing arm 45. The idler pulley 44 is mounted between the walls of the supporting portion 47 and is supported on a shaft 55 which has an enlarged head 56 and which is fixed in the supporting portion 47 by a snap ring 57. The idler pulley 44 rotatably mounted between the sides of the supporting portion 47 of the tape sensing arm 45 by a pair of spacers 58. The axis of the pivot stud 50 is parallel to and spaced from the axis of the drive shaft 13 so that the tape sensing arm 45 rocks about the pivot stud 50 in a plane which is perpendicular to the axis of the drive shaft 13 and which is parallel to the longitudinal axis of the tape 36 as it is wound upon the tape take-up reel 35.

The web 36 enters the device from a tape preparation or utilization device (not shown) and upon entering passes over a guide roller 61 which is mounted on the supporting plate 11. The web then reverses its course and passes over a guide roller 62 which is mounted on the tape sensing arm 45 in alignment with the guide roller 62. From the guide roller 62 the tape enters the tape take-up reel 35 to be wound thereon. When the tape 36 becomes taut between the tape preparation or utlization device and the tape take-up reel 35 the guide roller 62 will be moved into the position shown by the dotted line in FIG. 1 and will rock the tape sensing arm 45 into the dotted line position against the action of spring 53. When the tape between the tape preparation or utilization device (not shown) and the tape take-up reel 35 becomes slack the spring 53 will pivot the tape sensing arm 45 about the stud 50 and will bring the tape sensing arm 45 and the guide roller 62 into the position shown in solid lines in FIG. 1. These actions will respectively move the idler pulley 44 into the positions shown in dotted lines in FIG. 1 and into the position shown in solid lines. Thus, the position of the idler pulley with respect to the pulley halves 30 and 32 will be dependent upon the tension in the tape 36 which lies between the tape prepartion or utilization device (not shown) and the tape take-up reel 35.

Since the V-belt 43 is carried by the idler pulley 44 it will be raised and lowered when the idler pulley 44 is raised and lowered by the tape sensing arm 45. When the tape 36 becomes slack the spring 53 will raise the tape sensing arm 45 and consequently the idler pulley 44. This will raise the V-belt 43 and will wedge the belt into the V-shaped groove between the pulley halves 30 and 32. The V-belt 43 will thereupon become frictionally engaged with the annular beveled edges 40 and 42 of the pulley heads 30 and 32, respectfully. Since the pulley half 30 is secured to and rotated with the drive shaft 13 and since the pulley half 32 is secured to and rotates with sleeve 23 the frictional engagement of the V-belt 43 with the beveled edges 40 and 42 will constrain the pulley halves 30 and 32 to rotate together. This in turn will cause the sleeve 23 to rotate with the drive shaft 13. Since the tape take-up reel 35 is secured to the sleeve 23, this action will cause the tape take-up reel 35 to rotate with the drive shaft 13 and therefore will cause he tape 36 to be wound upon the tape take-up reel 35.

The winding of the tape 36 on the tape take-up reel 35 will cause the tape 60 to become more taut and eventually will increase the tension in the tape 36 to a point where the tape sensing arm 45 moves to the position shown in dotted line in FIG. 1. This will lower the idler pulley 44 with respect to the pulley halves 30 and 32 which in turn will cause the weight of the V-belt 43 to move the V-belt 43 out of frictional engagement with the beveled edges 40 and 42 of the pulley halves 30 and 32, respectively. Frictional disengagement is assured by two rollers 65. These rollers are mounted on the supporting plate 11 and serve to prevent the V-belt 43 from forming a circular configuration upon the lowering of the idler pulley 44. The rollers 65 instead cause the V-belt 43 to bulge out and away from the pulley halves 30 and 32. Thus, the pulley half 30 will no longer be frictionally engaged with the V-belt 43 and neither will the pulley half 32 be so frictionally engaged. Since the pulley half 30 is fixed to the drive shaft 13 the pulley half 30 will continue to rotate. However, since the sleeve 23 is fixed to the pulley half 32 and since the pulley half 32 is no longer frictionally engaged with either the V-belt 43 or the driving pulley half 30 the sleeve 23 will no longer be constrained to rotate with the drive shaft 13. Thus, further motion will not be imparted to the sleeve 23 and the tape take-up reel 35 will come to a stop. It will remain in a stopped position until the tape 36 again becomes slack at which time the tape sensing arm 45 will again raise the pulley 44 and cause the V-belt 43 to frictionally engage the pulley halves 30 and 32, thus, starting the cycle over again.

From the foregoing it may be understood that the present device serves to intermittently wind a tape 36 upon a tape take-up reel 35 and that the clutch of the device, which is comprised of the pulley halves 30 and 32 and the V-belt 43, serves to keep the tension between the tape take-up reel 35 and a tape preparation or utilization device at a minimum since it uncouples the tape take-up reel from its power source whenever the tension in the tape reaches a predetermined level.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. A clutch comprising:

rotatable input means, a driving member axially fixed with respect to the input means and mounted for rotation by the input means;

a driven member axially fixed with respect to the driving member and coaxial therewith;

a belt movable to a position to couple the driven member to the driving member;

output means for rotation with the input means when the driven member is coupled to the driving member; and feedback means responsive to a first predetermined condition of the output means for moving the belt into its coupling position thereby coupling the driving member to the driven member and causing the output means to rotate with the input means and responsive to a second predetermined condition of the output means to uncouple the driving member from the driven member.

2. The clutch according to claim 1 wherein:

the driving member is a plate having a beveled annular edge;

a driven member is a plate having a beveled annular edge which cooperates with the edge on the driving member to form a circular, V-shaped groove between the driving means and the driven means, and the belt is a V-belt having its sides angularly disposed to fit into the groove between the driving member and driven member.

3. The clutch according to claim 1 wherein the output means is a tape take-up reel and wherein the feedback means senses the tension in the tape entering the take-up reel and controls the coupling of the driving member to the driven member in response to that tension.

4. The clutch according to claim 3 wherein the feedback means is a lever mechanism mounted in engagement with the tape entering the tape take-up reel and an idler pulley mounted on the lever mechanism for moving the belt into and out of its coupling position in response to the tension in the tape.

5. A clutch comprising:
a first pulley half having a beveled annular edge,
means for rotating the first pulley half;
a second pulley half having a beveled annular edge for cooperation with the annular edge of the first pulley half to form a circular V-shaped groove between the first and the second pulley halves;
a belt having the same cross-sectional configuration as the groove between the pulley halves for clutching together the first pulley half and the second pulley half;
a tension pulley for supporting the belt;
an output device having at least two operating levels and connected to the second pulley half for rotation thereby, and
means responsive to the operating levels of the output device for moving the tension pulley to move the belt into rotational engagement with the pulley halves and thereby causing the rotating means to rotate the output device whenever the output device is in one of its operating levels and for moving the tension pulley to move the belt out of rotational engagement with the pulley halves whenever the output device is in another of its operating levels.

6. A clutch comprising:
a constantly rotating driving shaft;
a driving plate fixed to the driving shaft for rotation with the driving shaft;
a driven member coaxial with the driving shaft having at least two operating levels;

a driven plate fixed to the driven member and adjacent to the driving plate for rotating the driven member;
an idler pulley movable in a direction perpendicular to the axis of the driving shaft;
means responsive to the operating levels of the driven member for moving the idler pulley toward and away from the driving shaft; and
a friction belt passing simultaneously over the driven plate and the driving plate and passing over the idler pulley whereby movement of the idler pulley away from the axis of the driving shaft and the driven member in response to a first operating level of the driven member tightens the friction belt around the driving and driven plates thereby frictionally coupling the driving plate to the driven plate and rotating the driven member.

7. The clutch according to claim 6 wherein the means for raising and lowering the idler pulley is a lever arm mounted for rocking movement with respect to the driving shaft in engagement with the driven member and wherein the idler pulley is mounted on the lever arm.

References Cited by the Examiner

UNITED STATES PATENTS 3,098,396 7/1963 Unruh.
3,190,385 6/1965 Allport.

References Cited by the Applicant

2,632,542 3/1953 Hendrickson.
2,823,560 2/1958 Harp et al.
3,018,666 1/1962 Hoffman.

DAVID J. WILLIAMOWSKY, *Primary Examiner.*

L. H. GERIN, *Assistant Examiner.*